United States Patent [19]

Yaniger et al.

[11] Patent Number: 4,806,271

[45] Date of Patent: Feb. 21, 1989

[54] PREPARATION OF BASE-TYPE CONDUCTING POLYMERS

[75] Inventors: Stuart I. Yaniger, Palmdale, Calif.; Alan G. Macdiarmid, Drexel Hill, Pa.; Marie Angelopoulos, Dover, N.J.

[73] Assignee: Lockheed Corporation, Calabasas, Calif.

[21] Appl. No.: 13,305

[22] Filed: Feb. 11, 1987

[51] Int. Cl.$^4$ .................. H01B 1/00; H01B 1/06
[52] U.S. Cl. .................. 252/500; 252/518; 528/397; 528/422; 525/540
[58] Field of Search .................. 252/518, 500; 528/397, 528/422; 525/540; 524/81, 156, 165, 167, 168, 169, 263

[56] References Cited

U.S. PATENT DOCUMENTS

| | | |
|---|---|---|
| 3,813,264 | 5/1974 | Boothe et al. |
| 3,835,102 | 9/1974 | Shinohara et al. |
| 4,466,910 | 8/1984 | House .................. 252/500 |
| 4,466,911 | 8/1984 | House .................. 528/397 |
| 4,505,845 | 3/1985 | House .................. 252/518 |
| 4,505,846 | 3/1985 | House et al. .................. 252/500 |
| 4,511,492 | 4/1985 | Swedo et al. .................. 528/422 |
| 4,519,940 | 5/1985 | Schroeder et al. |
| 4,615,829 | 10/1986 | Tamura et al. |
| 4,620,943 | 11/1986 | Denisevich et al. |

Primary Examiner—Josephine Barr
Attorney, Agent, or Firm—Max Geldin

[57] ABSTRACT

Production of base-type conductive polymers, particularly from the family of conductive polyaniline, by reacting a base-type non-conductive polymer containing carbon-nitrogen linkages, e.g., polyaniline, with a cation donor compound, such as $R_2SO_4$, $R'SO_2Cl$ or $R''_3SiCl$, where R, R' and R" are alkyl or aryl, such as dimethyl sulfate or tosyl chloride, and forming an electrically conductive polymer in which the R groups of $R_2SO_4$, the $R'SO_2$ groups of $R'SO_2Cl$, or the $R''_3Si$ groups of $R''_3SiCl$ are covalently linked to the nitrogen atoms of the polymer.

15 Claims, No Drawings

PREPARATION OF BASE-TYPE CONDUCTING POLYMERS

BACKGROUND OF THE INVENTION

The present invention relates to the production of electrically conductive polymers. These polymers are derived from non-conductive base-type polymers. The electrically conductive polymers so formed are therein termed "base-type conductive" polymers. The invention is particularly concerned with novel procedures for the production of novel base-type polymers, such as conductive polyaniline, having high electrical conductivity, which do not suffer internal diffusion between conductive and non-conductile regions, do not lose conductivity on contact with water, and have good processability.

The free-base form of polyaniline is believed to comprise subunits having the formula:

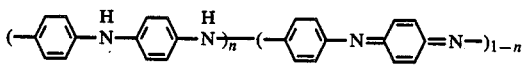

where n is between 0 and 1. The oxidation state of polyaniline referred to as "emeraldine" is believed to have a value of n of about 0.5.

The free-base form of polyaniline is electrically non-conductive. Protonic acid doping of polyaniline by reaction of polyaniline with a protonic acid HX where X is, for example, Cl, to produce electrically conductive polyaniline is known, for example, as disclosed in A. G. MacDiarmid, et al, Mol. Cryst. Liq. Cryst. 121, 173 (1985). Conductive polyaniline of this type has been employed in batteries, as disclosed, for example, in French Patent 1,519,729.

However, conductive polyaniline produced by protonic acid doping has several disadvantages. These prior art conductive materials tend toward diffusion when applied to a non-conductive dopable polymer substrate. For example, if one desires to make a conductive polyaniline trace on a non-conductive polyaniline free-base substrate, the trace remains conductively stable only for a very short time, after which it will start spreading until eventually the entire substrate has a constant conductivity.

Further, base-type conductive polymers, as represented by the polyaniline class of conductive polymers, have conductivities which are unstable on contact with water. Stability on contact with water is extremely rare in conducting polymers.

In addition, base-type conducting polymers, such as polyaniline, have poor processability; they tend to be somewhat insoluble powders. The few solvents that will dissolve such conductive powders are substances such as fuming sulfuric acid or aqueous formic acid, which are relatively difficult to handle and often chemically degrade the polymer. Further, if one attempts to cast a film of such conductive polymers from such solvents, they simply tend to convert either into a powder or brittle film.

An object of the present invention is the provision of improved base-type electrically conducting polymers of the class of conductive polaniline.

Another object of the invention is to provide a process for producing electrically conductive polymers, such as conductive polyaniline, which enables the physical and electrical properties on the conductive polymers to be more readily controlled.

Still another object is the provision of a novel procedure for the production of novel highly conductive base-type polymers, such as conductive polyaniline, which do not tend to diffuse when formed on a non-conductive dopable polymer substrate and which generally do not lose significant conductivity on contact with water.

Yet, another object of the invention is the production of base-type conductive polymers, such as conductive polyaniline, which have good processability characteristics.

SUMMARY OF THE INVENTION

The above objects are achieved, according to the invention, by the cationic doping of base-type non-conductive polymers, particularly from the family of the polyanilines, to produce electrically conductive polymers. This is accomplished by reacting a base-type non-conductive polymer containing carbon-nitrogen linkages with a compound or reactant having an organic, inorganic or organometallic group capable of covalently binding to the nitrogens of the polymer and forming an electrically conductive polymer in which such groups are covalently linked to the nitrogen atoms of the polymer.

Thus, base-type non-conductive polymers, particularly as represented by the free-base polyaniline, can be reacted with a cation donor compound, hereinafter termed a "B+ donor compound", such as $R_2SO_4$, $R'SO_2Cl$, or $R_3''SiCl$, where R, R' and R'' are each an organic group, as defined below, to form a polymer salt in which a covalent bond is formed between a nitrogen of the polymer and the R group, when the reactant is $R_2SO_4$, between such nitrogen and the $-SO_2R'$ group, when the reactant is $R'SO_2Cl$ and between the nitrogen and the silicon, when the reactant is $R_3''SiCl$. The term "base-type conductive" polymers employed herein accordingly is intended to denote the polymer salts formed by the above reaction.

The resulting polymer contains as the essential feature one of the above covalent linkages between R, $-SO_2R'$ or $-SiR_3$ and has similar or higher electrical conductivity as compared to the prior art conductive base-type polymers, such as conductive polyaniline, prepared by the reaction of, for example, free-base polyaniline, with a protonic acid, such as hydrochloric acid. The conductive polymers of the invention, having the above-noted essential feature of a covalent linkage between R, or between $-SO_2R'$, or between $-SiR_3''$, and a nitrogen in the polymer, results in pinning the conductive region, so that when the undoped polymer is doped only in certain regions, the conductivities of the doped and undoped regions do not change during extended periods. In addition, most conductive polymers of the invention do not lose significant conductivity on contact with water, whereas conductive base-type polymers of the prior art, such as conductive polyaniline produced by protonic acid doping, tend to lose significant conductivity on contact with water. Further, by tailoring the R, R' or R'' groups as desired, the properties of the polymer can be varied to provide good processability of the resultant polymer, e.g., the control of the solubility of the polymer in suitable solvents, rendering possible the casting of the conductive polymers of the invention as a film on a suitable substrate.

DETAILED DESCRIPTION OF INVENTION AND PREFERRED EMBODIMENTS

The base-type conductive polymers of the invention are prepared by the reaction of a base type non-conductive polymer containing the carbon-nitrogen linkage with a B+donor material as defined above that accepts electrons to form a covalent chemical bond with the polymer. The reaction for producing the electrically conductive organic polymers of the invention can be represented as follows:

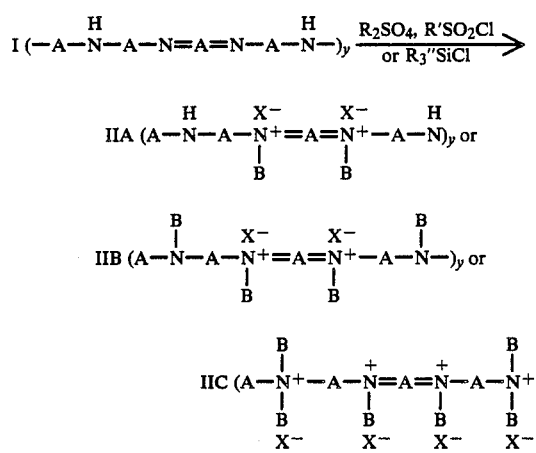

where A is a carbon-containing group, such as aryl, particularly the benzene ring, and including naphthyl and biphenyl, and substituted benzene, naphthyl or biphenyl groups, such as the alkyl substituted derivatives, e.g., 2-methyl biphenyl, butyl naphthalene, 2-methyl aniline, and aryl substituted derivatives, e.g., beta phenyl naphthalene and beta tolyl naphthalene; B is a group which readily forms a covalent bond with nitrogen, and which can be R, SO₂R' or SiR₃", where R, R' and R" can be alkyl, e.g., containing 1 to 20 carbon atoms, such as methyl, ethyl and the like, and aryl, e.g., benzyl, tolyl, xylyl, and other aromatic moieties; X is the anion RSO₄⁻ or a halogen, such as Cl⁻, and y is an integer ranging from about 1 to about 1,000, e.g., about 10 to about 100. When y is in the low end of the above range, e.g., when y is 1 or 2, the materials are known as oligomers and are intended to be included within the term "polymer" employed herein. The polymer in its conductive form can be of form IIa, IIb or IIc above, or any combination of these forms.

The preferred non-conductive polymer employed as the basic polymeric starting material is polyaniline emeraldine free-base (PFB). This material is reacted according to the above general scheme, with a compound, such as R₂SO₄, R'SO₂Cl or R₃"SiQ, where Q is a halogen, such as Cl or Br, in the manner noted below:

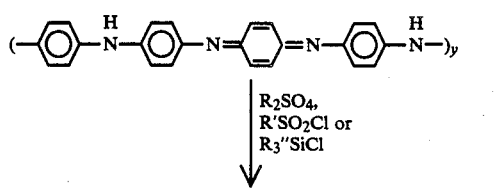

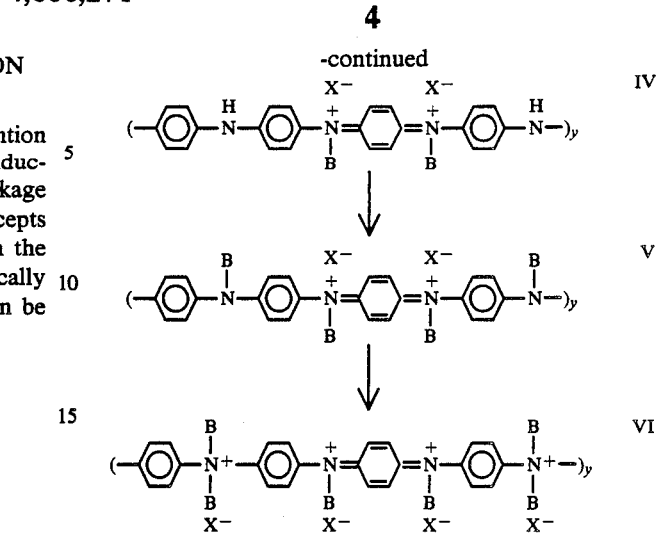

In the representations III-VI, B, R, R', R" and X are as defined above, and y has the values noted above.

Thus, if the reaction is carried out using R₂SO₄ as the B+donor compound, R+ is the donor, i.e., the organic cation B which is covalently linked to the N atoms of the polymer, and X is a stable anion RSO₄⁻. When R'SO₂Cl is the B+ donor reactant, the organic cation B is the R'SO₂+ group, which is covalently linked to the N atoms of the polymer through the S atom of such group, and X is the stable Cl⁻ anion. When R₃"SiCl is the B+ donor reactant, the cation B is the R₃"Si+ group, which is covalently linked to the N atoms of the polymer through the Si atom of such group, and X is the stable Cl⁻ anion.

In place of polyniline containing phenyl groups, as noted above, there can be employed other non-conductive base-type polymeric starting materials of the polyaniline family, containing naphthalene or biphenyl groups, the resulting conductive polymers thus produced according to the invention being analogous base-type conductive polymers containing naphthyl or biphenyl groups, respectively, and wherein the B groups are covalently linked to nitrogen. Such polymeric starting materials can include other non-conductive base-type polymers containing carbon atoms linked to nitrogen, such as cyanogen polymer containing the recurring unit:

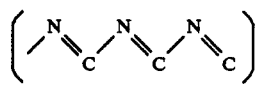

The starting materials of the invention can also include non-conductive mixtures and blends of the above polymers, and copolymers of the above polymers and other polymers, such as a blend of polyaniline and polymethylmethacrylate, and polymer alloys, such as polybenzimidazole-polyimide alloys, containing carbon-nitrogen groups.

Thus, the term "non-conductive polymer" as employed herein is intended to denote any of the above homopolymer or copolymer materials.

The invention will be described hereinafter, however, mostly in terms of the use of the preferred non-conductive free-base polyaniline as polymeric starting material for production of the preferred highly conductive polyaniline containing covalently linked B groups to nitrogen.

In carrying out the reaction, the polyaniline free-base is treated with a B+ donor compound, such as $R_2SO_4$, $R'SO_2Cl$ or $R_3''SiCl$, and the like, where R, R' and R'' have the definitions noted above. Thus, for example, the reactant which forms a covalent chemical bond with the nitrogens of the polyaniline non-conductive free-base or equivalent polymer noted above, can be, for example, one of the above B+ donor compounds, such as dimethyl sulfate, diethyl sulfate, $p-CH_3-C_6H_4SO_2Cl$, $C_6H_5SO_2Cl$, $(CH_3)_2CHSO_2Cl$ and trimethyl silyl chloride. Also, multifunctional reagents, e.g., $ClSO_2-C_6H_4-C_6H_4-SO_2Cl$, can be employed.

Other possible B+ donor compounds are those containing active halogens present in such species as $RR'B'X$, $RB'X_2$, $RR'PX$, $RPX_2$, $R(CO)X$, $RSX$, $R_{4-u}SnX_u$ (u=1, 2, 3 or 4), $(RO)_{4-u}TiX_u$, etc., where X is a halogen or similar stable anionic leaving group, and B' represents boron. These reactions produce compounds containing N—B', N—P, N—(CO)R, N—S, N—Sn, and N—Ti bonds. Such groups can be readily placed on the N atoms of the polyaniline polymers by reacting such polymers with the appropriate active halogen (or similar) compound.

The molar proportions of B+ donor compound to non-conductive nitrogen-containing polymer free-base can range from about 0.01 to about two R+, $SO_2R'+$ or $SiR_3+$ groups per nitrogen. In the case of polyaniline, such molar proportions can range from about 0.01 to about 8, per polymer repeat unit.

The reaction can be carried out as a heterogeneous reaction wherein the polymer starting material is not dissolved but is reacted directly with the B-containing reactant, e.g., $R_2SO_4$, or the polymer starting material, such as polyaniline non-conductive free-base, can be dissolved in a suitable solvent which does not react irreversibly with the R-containing donor, e.g., dimethylsulfoxide (DMSO), dimethylformamide (DMF), tetrahydrofuran (THF), methylene chloride, acetonitrile and pyridine.

The reaction is generally carried out at about ambient or room temperature, e.g., 20°-25° C., or at higher or lower temperatures.

The rate of reaction can range widely, depending on the particular B+ donor or R-containing reactant employed. Thus, the reaction rate can range from almost instantaneous to several hours or longer.

In the case of polyaniline free-base, this is a high polymer having a molecular weight of the order of 50,000 to 80,000. Lower molecular weight forms of polyaniline can also be employed, such as an oligomer of polyaniline containing 8 sub-units and having a molecular weight of about 800 to 900. When the free-base is reacted with the "B+" donor, for example, $R_2SO_4$, the R group thereof can be substituted for every hydrogen on the polymeric chain to form the conductive polymer, as represented by Formula V above. In the case of $R'SO_2Cl$ or $R_3''SO_2Cl$, the $R'SO_2$ or the $R_3''SO_2$ group thereof can be substituted for every hydrogen on the polymeric chain. Further reaction results in all amine-like nitrogens forming quaternary ammonium groups, as illustrated by Formula VI above. However, the number of covalently bound R or $R'SO_2$ groups on the polymer can be controlled by interrupting the reaction at a predetermined time prior to substitution of all of the hydrogen atoms on the polymer with R or $R'SO_2$ groups, as illustrated by Formula IV above.

The resulting conductive polymer has high conductivity, e.g., 10 to 12 orders of magnitude higher than most organic polymers. Thus, the conductivity of the invention polymers can be 10 times the value of the conductivity reported for the protonic acid doped polyaniline of the prior art. The conductivity of the invention polymers, e.g., conductive polyaniline, can be varied by reducing or increasing the number of covalently linked B groups, as by controlling the degree of completeness of the reaction, the conductivity increasing with increase in the number of covalently linked B groups up to a certain number and then subsequently decreasing with an increasing number of B groups. The conductivity can also be varied by changing the oxidation state, i.e., the relative number of amine and imine groups.

The physical properties of the highly conductive polymer produced according to the invention can be varied, for example, so as to enhance the processability of the polymer. Thus, for example, one can vary the chain length of an alkyl group R in the "B+" donor compound $R_2SO_4$ to increase the solubility of the polymer. This permits the casting of a film of the conductive polymer on a substrate and permits control of the mechanical properties, such as ductility of the polymer.

With the "B" groups covalently linked to the nitrogen atoms in the polymer, the charged groups are pinned, so that when the polymer is applied to a specified region of the undoped insulating polymer substrate, the region to which the conductive polymer is applied will remain conductive over an extended period of time without diffusion into adjacent non-conductive regions of the undoped polymer substrate. In addition, the base-type, e.g., polyaniline, conductive polymers of the invention are usually stable on contact with water. Stability on contact with water is extremely rare in conducting polymers.

The following are examples of practice of the invention:

EXAMPLE 1

Polyaniline free-base powder was exposed heterogeneously to pure dimethylsulfate for 1 hour at 25° C. The resulting polymer showed a conductivity of 1.0 S/cm, and was stable in $H_2O$.

EXAMPLE 2

Diethyl sulfate (neat) was reacted heterogeneously with polyaniline free-base for 12 hours. The resulting polymer has a conductivity of 1 S/cm and was stable to water.

EXAMPLE 3

Polyaniline free-base film was reacted with a solution of $CH_3C_6H_4SO_2Cl$ in methylene chloride for 14 hours at 25° C. The resulting polymer film showed a conductivity of 35 S/cm and was soluble in dichloromethane.

EXAMPLE 4

A solution of polyaniline free base in dimethylformamide was reacted with $(CH_3)_3SiCl$, 0.1 molar in dimethylformamide solvent, for 12 hours. This reaction took place with the exclusion of air and water. After washing with methylene chloride, the resulting polymer had a conductivity of 1.0 S/cm.

The base-type electrically conductive polymers of the invention have utility in the production of conductive composites, electronic components, electrical conductors, electrodes, batteries, switches, electrical shielding material, resistors, capacitors, and the like.

From the foregoing, it is seen that by reaction of base-type polymers, such as polyaniline, with certain non-protonic doping agents, the physical and chemical properties of the resulting conducting polymers can be more readily controlled and highly conductive novel polymers obtained.

While particular embodiments of the invention have been described for purposes of illustration, it will be understood that various changes and modifications within the spirit of the invention can be made, and the invention is not to be taken as limited except by the scope of the appended claims.

What is claimed is:

1. A process for producing a conductive polymer which comprises reacting a base-type non-conductive polymer having the general formula:

where A comprises an aryl group, with a compound selected from the group consisting of R₂SO₄, R'SO₂Cl and R₃"SiQ, where R, R' and R" are each selected from the group consisting of alkyl containing 1 to 20 carbon atoms and aryl, Q is a halogen, and y is an integer ranging from about 1 to about 1,000, and forming an electrically conductive polymer having the general formula:

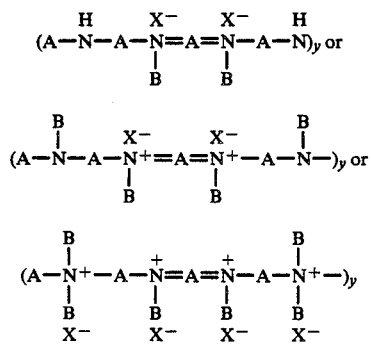

where B is a group selected from the class containing of R, SO₂R' and SiR₃", and X is selected from the group consisting of RSO₄⁻ and a halogen, the molar proportion of said compound to said non-conductive polymer ranging from about 0.01 to about two R⁺, SO₂R'⁺ or R₃"Si⁺ groups per nitrogen.

2. The process of claim 1, wherein said reaction forms a polymer salt having a covalent bond formed between a nitrogen of the polymer and the R group when said compound is R₂SO₄, or between said nitrogen and the —SO₂R' group when said compound is R'SO₂Cl, or between the nitrogen and the silicon when said compound is R₃"SiQ.

3. The process of claim 2, said reaction taking place in a solvent which does not react irreversibly with said donor compound.

4. The process of claim 1, wherein the base-type non-conductive polymer is selected from the group consisting of polyaniline, its naphthyl and biphenyl derivatives and alkyl and aryl substituted polyaniline and its alkyl and aryl substituted naphthyl and biphenyl derivatives.

5. A process for producing a conductive polymer which comprises reacting polyaniline free-base with a compound selected from the group consisting of R₂SO₄, R'SO₂Cl and R₃"SiCl, where R, R' and R" are each selected from the group consisting of alkyl containing 1 to 20 carbon atoms and aryl, and forming an electrically conductive polyaniline having the formula:

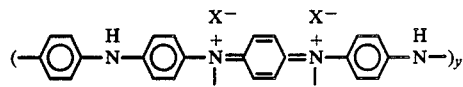

or

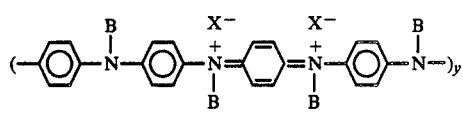

or

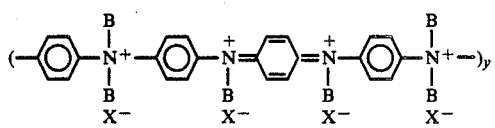

where X is selected from the group consisting of RSO₄⁻ and Cl⁻, B is a group selected from the class consisting of R, SO₂R', and SiR₃", and y is an integer ranging from about 1 to about 1,000, the molar proportion of said compound to said polyaniline ranging from about 0.01 to about 8 per polymer repeat unit.

6. The process of claim 5, said compound selected from the group consisting of (CH₃)₂SO₄, (CH₃CH₂)₂SO₄, p—CH₃—(C₆H₄)SO₂Cl, C₆H₅SO₂Cl, (CH₃)₂CHSO₂Cl, (CH₃)₃SiCl and ClSO₂—C₆H₄—C₆H₄—SO₂Cl.

7. The process of claim 6, said reaction taking place in a solvent selected from the group consisting of methylene chloride, dimethylsulfoxide, dimethylformamide, tetrahydrofuran, acetonitrile and pyridine.

8. An electrically conductive base-type polymer having the general formula:

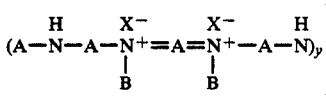

or

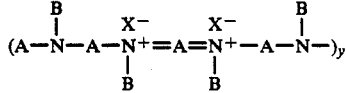

or

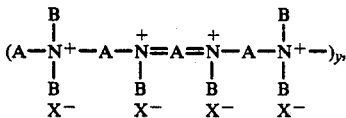

or a polymer comprised of a combination of such formula structures, where A comprises an aryl group, B is a group selected from the class consisting of R, SO₂R' and SiR₃", where R, R' and R" are each selected from the group consisting of alkyl containing 1 to 20 carbon atoms and aryl, X is selected from the group consisting of $RSO_4^+$ and a halogen, and y is an integer ranging from about 1 to about 1,000.

9. The electrically conductive polymer of claim 8, wherein the polymer is selected from the group consisting of polyaniline, its naphthyl and biphenyl derivatives and alkyl and aryl substituted polyaniline and its alkyl and aryl substituted naphthyl and biphenyl derivatives.

10. An electrically conductive base-type polymer having the general formula:

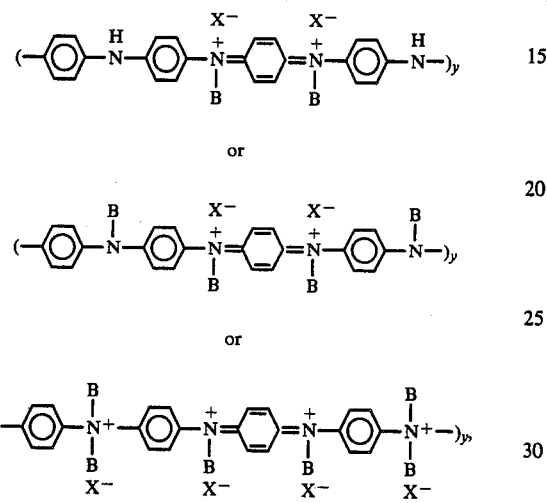

or

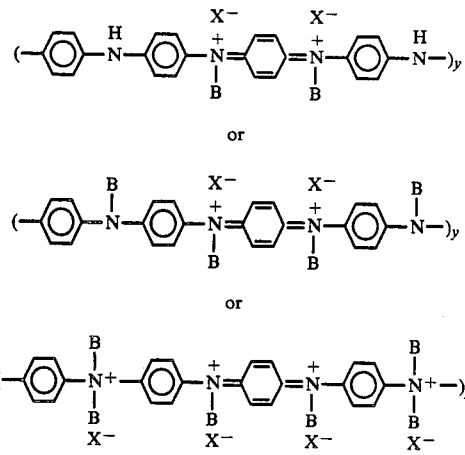

or

where B is a group selected from the class consisting of R, $SO_2R'$ and $SiR_3''$, where R, R' and R'' are each selected from the group consisting of alkyl containing 1 to 20 carbon atoms and aryl, X is selected from the group consisting of $RSO_4^-$ and $Cl^-$, and y is an integer ranging from about 1 to about 1,000.

11. The electrically conductive base-type polymer of claim 10, where R is selected from the group consisting of methyl and ethyl, and R' is benzyl or tolyl.

12. The electrically conductive base-type polymer of claim 10, where y ranges from about 10 to about 100.

13. The process of claim 1, the temperature of the reaction ranging from 20° to 25° C.

14. A process for producing a conductive polymer which comprises reacting polyaniline free-base with an effective amount sufficient to increase electrical conductivity of a compound selected from the group consisting of $R_2SO_4$, $R'SO_2Cl$ and $R_3''SiCl$, where R, R' and R'' are each selected from the group consisting of alkyl containing 1 to 20 carbon atoms and aryl, and forming an electrically conductive polyaniline having the formula:

where X is selected from the group consisting of $RSO_4^-$ and $Cl^-$, B is a group selected from the class consisting of R, $SO_2R'$, and $SiR_3''$, and y is an integer ranging from about 1 to about 1,000.

15. A process for producing a conductive polymer which comprises reacting a base-type non-conductive polymer having the general formula:

$$(-A-\overset{H}{N}-A-N=A=N-A-\overset{H}{N}-)_y$$

where A comprises an aryl group, with an effective amount sufficient to increase electrical conductivity of a compound selected from the group consisting of $R_2SO_4$, $R'SO_2Cl$ and $R_3''SiQ$, where R, R' and R'' are each selected from the group consisting of alkyl containing 1 to 20 carbon atoms and aryl, Q is a halogen, and y is an integer ranging from about 1 to about 1,000, and forming an electrically conductive polymer having the general formula:

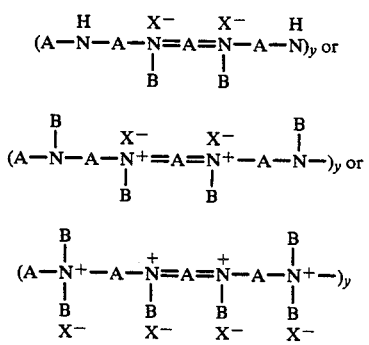

where B is a group selected from the class consisting of R, $SO_2R'$ and $SiR_3''$, and X is selected from the group consisting of $RSO_4^-$ and a halogen.

* * * * *